(No Model.)

M. M. M. SLATTERY.
INDUCTION COIL.

No. 358,793. Patented Mar. 1, 1887.

WITNESSES:
Chas. T. Hodges
E. E. McAdam

INVENTOR:
Marmaduke M. M. Slattery,
by J. B. Talbot his attorney

UNITED STATES PATENT OFFICE.

MARMADUKE M. M. SLATTERY, OF WOBURN, MASSACHUSETTS, ASSIGNOR TO THE SUN ELECTRIC COMPANY, OF MAINE.

INDUCTION-COIL.

SPECIFICATION forming part of Letters Patent No. 358,793, dated March 1, 1887.

Application filed December 1, 1886. Serial No. 220,335. (No model.)

*To all whom it may concern:*

Be it known that I, MARMADUKE M. M. SLATTERY, of Woburn, in the county of Middlesex and State of Massachusetts, have invented certain new and useful Improvements in the Construction of Induction-Coils of Electricity, of which the following is a specification.

My object in this invention is an efficient and economical construction of generators of electricity operating by induction and having a closed magnetic circuit.

It has been usual to construct this class of generator in the form of a ring or rectangle, the same being, however, continuous from end to end, and this has necessitated the use of hand-labor in winding the coils upon the core. It is obviously desirable to avoid this expense, if possible, by the employment of machinery, and I therefore divide the core into two parts, each of approximately the form of a semicircle or semi-rectangle, and thus enable the two halves to be wound separately on a lathe and their ends afterward placed together, thus closing the magnetic circuit.

It is of course well known that it is desirable to laminate or divide the core, so as to avoid eddy currents, and consequent loss of energy, and I therefore prefer to employ thin sheets of soft iron punched or stamped to the required shape, laid one upon the other and suitably insulated. These, being bound together, form one-half of the shape, and can be readily placed in a lathe and the wire wound thereon.

I wind the wire on the yoke, leaving the two arms free, these being afterward covered with hollow coils or helices, which have been separately wound on a mandrel or former, and which are slid over the confronting free ends of each half, practically the whole of the core being thus covered with wire. I prefer the simple rectangular form, as being cheapest and most readily handled; but a semicircle or semi-ellipse might, of course, be used.

Figure 1:
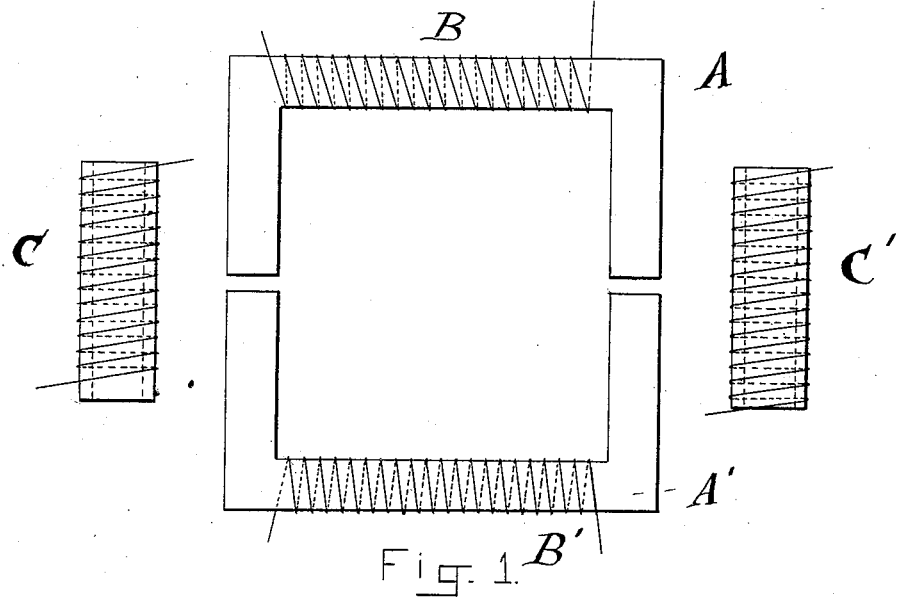

In the drawings, Figure 1 is a plan view, A A' being the two semi-rectangular portions built up, as described, of laminæ or thin sheets having coils B B' wound on their respective yokes.

Figure 2:
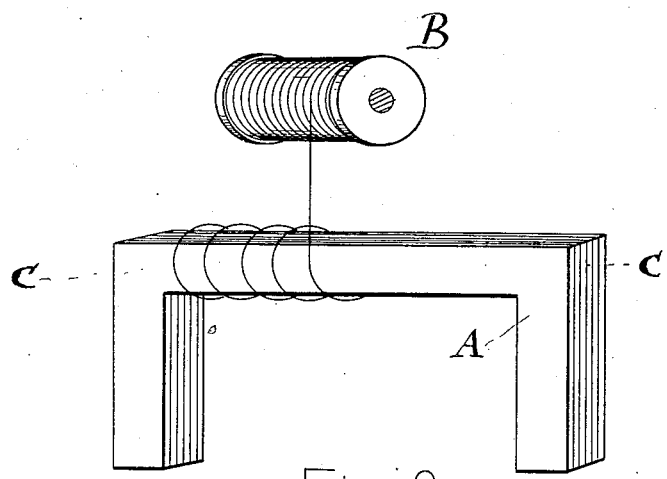

C C' are the separately-wound helices, which are to be slid onto the arms of each half of the core, which will therefore meet in the middle of the coil and close the magnetic circuit. Fig. 2 shows the method of winding the coil on the yoke, A being the core, B a reel or spool of wire, and C C' points or centers at which the core is revolved on a lathe.

Other details of construction are omitted—such as the number of layers, mode of connections and the like—as I make no claim herein to them, nor to the closing of the magnetic circuit or the laminated core, *per se*, these having been known for years; but What I do claim as new, and desire to secure by Letters Patent of the United States, is—

1. An induction-coil composed of a core of two similar parts formed of a series of superimposed sheets of soft iron stamped or cut to the approximate shape of a semi-rectangle, and convolutions of wire wound on the yoke of such parts, the same having free arms to receive or have slid upon them other helices or coils, substantially as shown and described.

2. In an induction-coil, a core in two parts approximately of the shape of half a rectangle, the confronting ends of which close a magnetic circuit, coils wound upon or about the middle portions or yokes of such parts, and separately coiled helices upon the free arms of such parts.

MARMADUKE M. M. SLATTERY.

Witnesses:
 J. E. TALBOT,
 C. E. HODGES.